(12) United States Patent
Trossen

(10) Patent No.: US 8,671,017 B2
(45) Date of Patent: Mar. 11, 2014

(54) INTEGRATED SYSTEM AND METHOD FOR CENTRALIZED TRANSIT INFORMATION HANDLING

(75) Inventor: Rolf Trossen, Gerhardshofen (DE)

(73) Assignee: Trapeze ITS U.S.A., LLC, Cedar Rapids, IA (US)

( * ) Notice: Subject to any disclaimer, the term of this patent is extended or adjusted under 35 U.S.C. 154(b) by 1180 days.

(21) Appl. No.: 12/171,608

(22) Filed: Jul. 11, 2008

(65) Prior Publication Data

US 2009/0240515 A1   Sep. 24, 2009

Related U.S. Application Data

(63) Continuation of application No. 10/093,080, filed on Mar. 7, 2002, now abandoned.

(60) Provisional application No. 60/274,276, filed on Mar. 8, 2001.

(51) Int. Cl.
*G06Q 30/00* (2012.01)
(52) U.S. Cl.
USPC ............................................. 705/14.1
(58) Field of Classification Search
USPC ............................................. 705/14.1
See application file for complete search history.

(56) References Cited

U.S. PATENT DOCUMENTS

| | | | |
|---|---|---|---|
| 5,339,239 A | 8/1994 | Manabe et al. | |
| 6,161,097 A | 12/2000 | Glass et al. | |
| 6,278,965 B1 | 8/2001 | Glass et al. | |
| 6,421,600 B1 * | 7/2002 | Ross | 701/117 |
| 6,526,335 B1 * | 2/2003 | Treyz et al. | 701/1 |
| 6,571,279 B1 | 5/2003 | Herz et al. | |
| 2002/0019759 A1 | 2/2002 | Arunapuram et al. | |
| 2002/0032587 A1 | 3/2002 | Bermel | |
| 2002/0065711 A1 | 5/2002 | Fujisawa et al. | |
| 2002/0072963 A1 | 6/2002 | Jonge | |

OTHER PUBLICATIONS

Johnson, Robert, "Ad-Packed TVs May Soon Be Boarding City Buses", The Wall Street Journal, dated Feb. 21, 2001, pp. B1-B2.
International Search Report for International Application No. PCT/US/06913, dated Oct. 3, 2002.
The ITEC Network Transit Area, Overview, p. 1, printed from the Internet Web Site: http://www.itec.com/network3/pages/transit01.html, on Mar. 6, 2002.
The ITEC Network Transit Area, How It Works, pp. 1-2, printed from the Internet Web Site: http://www.itec.com/network3/pages/transit02.html, on Mar. 6, 2002.
Jensen, Jeff, The ITEC Network Mobile System Operation and Technical Overview, (3000-CDI-003-002) pp. 1-22, Copyright 1999.
Hartlieb, Jeffrey, The ITEC Network Smart Window Display Overview, (3000-CEI-002-003) pp. 1-11, Copyright, 1999.

* cited by examiner

*Primary Examiner* — Daniel Lastra
(74) *Attorney, Agent, or Firm* — Sughrue Mion, PLLC

(57) ABSTRACT

A centralized information center is disclosed. The centralized information center includes a plurality of source information inputs. The centralized information center disclosed also includes a central processor configured to receive information from the source information inputs and a memory coupled to the processor. A program runs on the central processor. The program organizes information, prioritizes information and generates information flows. Selective information flows are provided to a central office for a transportation system and to a transportation vehicle. The plurality of source information inputs includes vehicle-related information, operations-related information, and external service provider information.

15 Claims, 3 Drawing Sheets

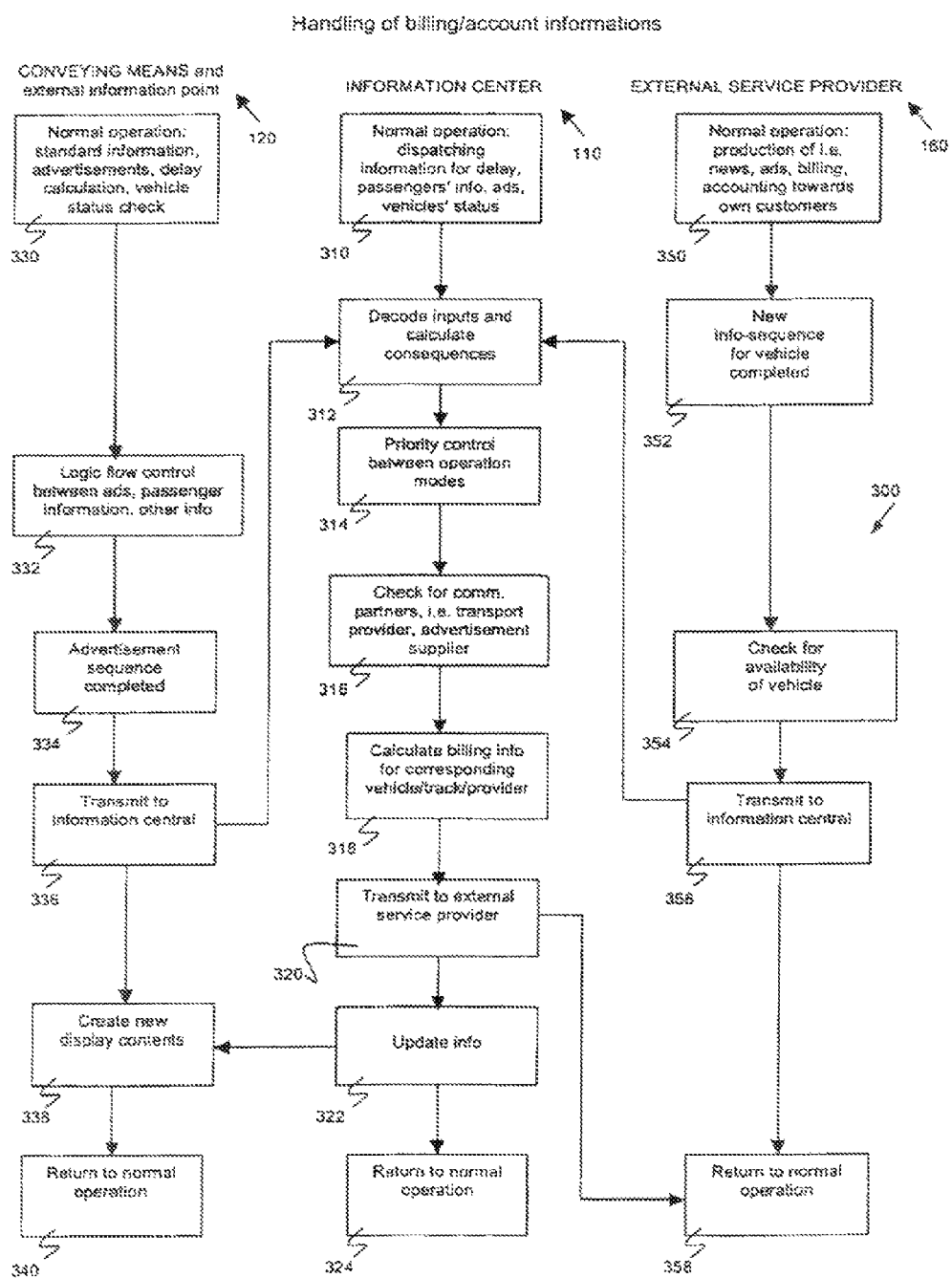

INTEGRATED SYSTEM AND METHOD FOR CENTRALIZED TRANSIT INFORMATION HANDLING

REFERENCE TO RELATED PATENT APPLICATIONS

This application is a continuation of U.S. application Ser. No. 10/093,080 filed on Mar. 7, 2002, now abandoned which claims the benefit of U.S. provisional application No. 60/274,276, filed on Mar. 8, 2001, entitled "Integrated System for Detailed Passenger Information and Support of Traffic Management," and is herein incorporated by reference.

BACKGROUND

The disclosure relates generally to systems for managing information in transportation systems. Further, the disclosure relates to a system in which detailed passenger information, traffic management and other information is integrated and managed by a centralized system.

Conventionally there exist transportation systems which utilize a centralized system for providing schedule and other passenger-specific information to transportation vehicles and to transportation kiosks and terminals. Such systems are able to provide passengers and awaiting passengers with information relating to the arrival and/or departure of transportation vehicles. However, as information systems and communication networks have grown in both importance and usability, there are available various information sources, all providing different types of data for passenger consumption, awaiting passenger consumption, and other purposes. However, conventionally there have not been systems and/or methods configured to handle different types of inconsistent data, to prioritize the data, to organize the data, and to correlate the data. Accordingly, the quality of service provided to passengers, awaiting passengers, and other users of the information has been less than ideal.

Accordingly, there is a need for a centralized information system in which information may be supplied by external sources and can be centrally selected, combined, and organized. There is also a need for a centralized information system for a transportation system that provides consistent data to mobile and stationary information points. Further, there is a need for a centralized information system for a transportation system which is configured to selectively provide all mobile and stationary information points with specified information, substantially simultaneously. Further still, there is a need for a centralized information system for a transit system that includes interfaces between the external sources which are uniformly managed and monitored. Yet further still, there is a need for a centralized information system for a transit system that provides balancing between services that are provided jointly with the transportation operator or by a single party, and external service providers. Yet further still, there is a need for a centralized information system for a transit system which is configured to automate the information integration.

It would be desirable to provide systems and/or methods that provide one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a centralized information center. The centralized information center includes a plurality of source information inputs. The centralized information center also includes a central processor, configured to receive information from the source information inputs. Further, the centralized information center includes a memory coupled to the processor. Further still, the centralized information center includes a program running on the central processor and a program configured to organize information, prioritize information and generate information flows. Selected information flows are provided to a central office for a transportation system and to a transportation vehicle. The plurality of source information inputs include vehicle-related information, operations related information, and external service provider information.

Another exemplary embodiment relates to a method of managing information for a transportation system. The method includes receiving, by an information center, information from a plurality of information sources. The information includes vehicle-related information, operations-related information, and external service provider information. The method also includes recording, by the information center, the received information. Further, the method includes processing, by the information center, the received information such that the information is organized and prioritized. Further still, the method includes distributing, by the information center, the information to transportation vehicles, external service providers, and external access points.

Another exemplary embodiment further relates to a method of managing information for a transportation system. The method includes receiving, by an information center, information from a plurality of information sources. The information includes vehicle-related information, operations-related information, and external service provider information. The method also includes recording, by the information center, the received information. Further, the method includes processing, by the information center, the received information such that the information is selected, organized, and combined. Further still, the method includes distributing, by the information center, the information to transportation vehicles, external service providers, and external access points.

Yet further still, an exemplary embodiment relates to an information management system for a transportation system. The information management system includes a means for receiving, by an information center, information from a plurality of information sources. The information includes vehicle-related information, operations-related information, and external service provider information. The information management system also includes a means for recording, by the information center, the received information. The information management system also includes a means for processing, by the information center, the received information such that the information is selected, organized, and combined. Yet further still, the information management system includes a means for distributing, by the information center, the information to transportation vehicles, external service providers, and external access points.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 3 is an exemplary process diagram depicting methods of handling billing and/or accounting information.

DETAILED DESCRIPTION OF EXEMPLARY EMBODIMENTS

Figure 1:
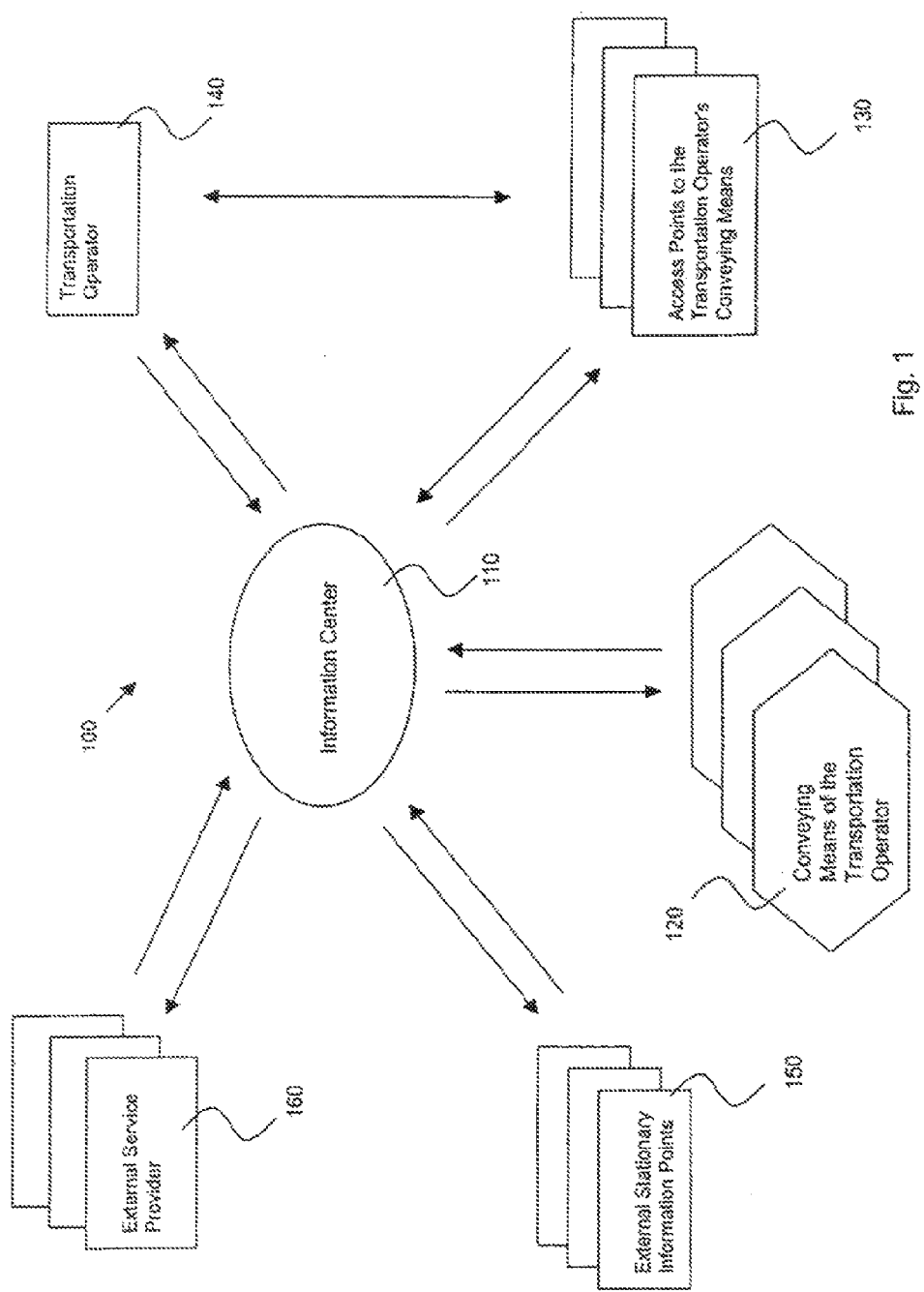
FIG. 1 is an exemplary block diagram of a centralized information system.

Referring now to FIG. 1, a centralized information management system 100 is depicted. Centralized information management system includes an information center 110. Information center 110 receives information from a plurality of sources, the information center 110 having a plurality of source information inputs from the plurality of external sources. Information center 110 may be, for example, the central office of a transportation system operator.

One source of information may include the passenger-conveying means 120 of the transportation operator. Transportation-conveying means 120 may be, in an exemplary embodiment, a train, a bus, a tram, a subway, a monorail, an airplane, a ship, or other passenger-conveying means.

Another exemplary input to information center 110 may include access points 130 to the transportation operators-conveying means. Access points 130 may include, but are not limited to, transit centers, transit kiosks, transit shelters, transit depots, and interactive information sources at locations in which passengers may be boarding a transit vehicle or conveying means. At access points 130, electronic output devices such as signs and/or screens having information which is changed dynamically throughout the day and are configured to provide information to persons such as awaiting passengers. The information displayed to awaiting passengers may include, but is not limited to, arrival information, departure information, advertising information, entertainment information, and the like.

Another exemplary input to information center 110 may include transportation operator 140. Transportation operator 140 may be a time schedule system, transit control center, transit control computer, dispatch system, or the like. Transportation 140 may include functionality to report time scheduling and tracking of transit vehicles as well as managing transit vehicles and transit system functions. Information relating to transit vehicles location, schedules, etc. is communicated to information center 110.

Yet another exemplary input to information center 110 may include information from external stationary information points 150. External stationary information points 150 may be, in an exemplary embodiment, terminals, signs, kiosks, mobile devices, etc. that may be located at shops, and in public places, at homes, in airports, in railway stations, bus depots, bus shelters, on a person, etc. External stationary information points 150 may have both generalized and specific information relating to the transit system along with other types of information.

Still yet another exemplary input to information center 110 may include information from external service providers 160. External service providers 160 provide information that is nontransit related, such as advertisements, commercials, news, public service announcements, weather announcements, etc. External service providers 160 may provide such information for a fee or may provide service information for free or alternatively, may receive a fee for providing such information. External service providers may also include providers of entertainment that may be utilized, in conveying means 120 or at access points 130, by awaiting passengers or passengers on transit vehicles.

Information center 110 is therefore configured to receive input from a plurality of information sources, including, but not limited to conveying means of the transportation operator 120, access points to the transportation operators conveying means 130, transportation operator 140, external stationary information point 150, and external service provider 160. As well, information center 110 is configured to provide information to conveying means of the transportation operator 120, access points to the transportation operator's conveying means 130, transportation operator 140, external stationary information points 150, and external service providers 160. Communications between the information sources and information center 110 may be carried out over a plurality of communications infrastructure, including, but not limited to the internet, and other public communications networks and/or private or custom communications networks.

In an exemplary embodiment, information sources 120, 130, 140, 150, and 160 provide information to information center 110. Information center 110 receives information from the information sources via a variety of information inputs. Information center 110 is configured to organize, prioritize, manage, record, evaluate, balance, and/or combine the incoming information and generate a plurality of outgoing information flows. The outgoing information flows are then provided back to the information sources 120, 130, 140, 150, and 160 for processing and/or display. In an exemplary embodiment, it may also be desirable to provide information between transportation operator 140 and access point 130 directly bypassing information center 110. Such direct access may be used for certain scheduling and/or alert tasks.

Figure 2:
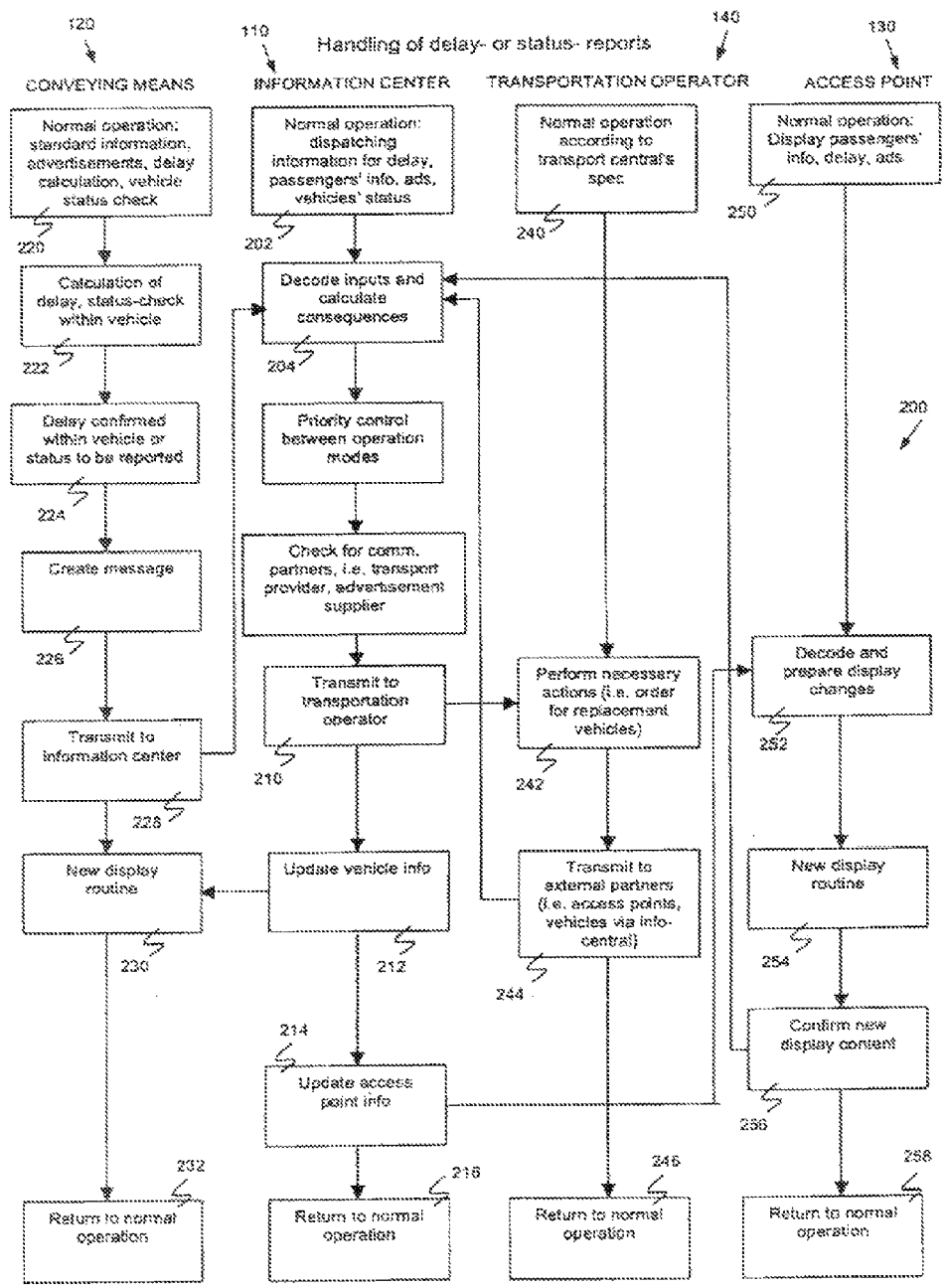
FIG. 2 is an exemplary process diagram depicting methods relating to handling of delays and/or status reports.

Referring now to FIG. 2, a process 200 is depicted. Process 200 relates to methods of handling delays and/or status reports utilizing information center 110. During normal operation, that is dispatching information for delays, passenger information, scheduling information, advertising information, vehicle status information, etc. (step 202) information center 110 carries out the functionality. Information center 110 decodes inputs and calculates and/or determines consequences (step 204). The inputs are received from information sources such as, but not limited to conveying means 120, transportation operator 140 and access points 130.

During normal operation conveying means 120 displays standard information, advertisements, and calculates delays, and checks vehicle status (step 220). Calculation of delays, status checks within the vehicle are made by an onboard electronic and computer system (step 222). Delays that are calculated are confirmed within the vehicle or the delay status is reported (step 224). An outgoing message is then created (step 226). The outgoing message is then transmitted to the information center (step 228). The information is then sent to information center 110 at step 204.

Similarly, a transportation operator operates according to a transport central specification (step 240). A plurality of necessary actions may be determined by transportation operator 140 (step 242). For example, if a vehicle breaks down on the route, an order or dispatch of replacement vehicles could be made by transportation operator 140. Further, in an exemplary embodiment, if there are substantial delays on a route or specific routes are running behind schedule or are overburdened, additional vehicles may be dispatched by transportation operator 140. Such analysis may be based on other inputs, for example, information may be transmitted to transportation operator 140 by information center 110 (step 210). The information from information center 110 may include but is not limited to information which originated with conveying means 120. Transportation operator 240 then transmits, to external partners (i.e., access points, vehicles via information center 110), specific information generated by transportation operator 140 (step 244). Once the information is transmitted to information center 110, transportation operator 140 returns to normal operation (step 246).

Access point 130 operates in a normal operation by displaying passenger information, delay information, advertising information, etc. (step 250). Information center 110 updates vehicle information based on all of the incoming information and the information flows that have been generated (step 212). Vehicle information is sent to the vehicle or conveying means 120 and a new display routine is run utilizing the vehicle information (step 230). The information system on conveying means 120 then returns to normal operation (step 232). Once the vehicle information has been updated, access point 130 information is similarly updated (step 214). Access points 130 receive information from information center 214 to update access point 130. Such information is decoded and prepared to produce display changes (step 252). Once the information has been decoded and prepared and display changes have been made, a new display routine is run (step 254). The new display content is then confirmed and sent to information system 110 (step 256). The confirmed display content information is used by information center 110 and recorded, for billing and display assurance functions. Once the confirmed message has been sent to information center 110 access point 130 returns to normal operation (step 258). As information center 110 updates access point 130 information, information center 110 then returns to normal operation (step 216).

Referring now to FIG. 3, an exemplary process diagram 300 is depicted including methods of handling, billing and/or accounting information. In the exemplary embodiment depicted, information center 110 interacts with conveying means 120 and external service provider 160. Information center 110 operates in a normal manner, that is dispatching information for delays, passenger information, advertisement vehicle statuses, etc. (step 310). Inputs are received from conveying means 120 and external service provider 160 and such inputs are decoded and consequences are determined and calculated (step 312).

Conveying means 120 operates in a normal manner, that is displaying standard information, advertisements, delay calculations, making vehicle status checks, etc. (step 330). Logic flow control between advertisements, passenger information, and other information is established for the vehicle (step 332). Advertisement sequences are then completed (step 334). Information is then transmitted to information center 110 step 312 (step 336).

External service provider 160 operates in a normal manner, that is producing news, advertisements, billing, accounting for the customer, etc. (step 350). New information sequences for vehicles are completed by the external service providers (step 352). Availability of vehicles is checked by the external service provider (step 354) and information is transmitted to information center 110 (step 356). Once information center 312 receives the inputs from conveying means 120 and external service provider 160 and consequences are calculated in step 312, priority control between the operating modes is begun (step 314). The priority is based on the information received from the conveying means and the external service providers. Within information center 110, a check for communication partners, in other words the transportation provider, the advertiser supplier, etc. are checked (step 316). Based on the check, a calculation is made for billing the corresponding vehicle, track, provider, etc. for the information services provided (step 318). Information center 110 then transmits billing information to the external service provider (step 320). External service provider 160 receives the billing information and then returns to normal operation (step 358). After the information is transmitted to the external service provider, information is updated and is provided to vehicle 120 (step 330). Information is then displayed on vehicle 120 (step 338) and the vehicle returns to normal operation (step 340). Once the information is updated by information center 110, information center 110 returns to normal operation (step 324).

Information center 110 records, processes and distributes information from and between the central office of a transportation operator 140, the passenger conveying means of the same transportation operator 120, other external service providers 160, stationary access locations to the conveying means of transportation operator 130, and other external stationary information points 150. Information system 110 supports traffic management, provides passenger information (conveyance related), such as but not limited to schedules, vehicle status, passenger load information, etc. Information center 110 also coordinates passenger information (non-conveyance related), such as advertising, news, weather and public service announcements. Information center 110 balances the services provided by the information sources between the transportation operators and other service providers.

Communication flows are provided between information center 110 and the plurality of information sources. Conveyance related information is sent between a transportation operator 140 and information center 110 (e.g. travel schedules, updated scheduled data, etc.). Information center 110 also records information which is operations related and is received from the transit vehicle or the passenger conveying means 120 of the transportation operator (e.g., operating statuses, driving data, etc.). Information center 110 further receives and records information from external service provider 160 (e.g., advertisements, current news, instructions, etc.). At information center 110 the information coming into the information center is evaluated, linked together and summarized into new outgoing information flows. The generated information flows are then distributed to recipients based on the type of information flow and the assignment.

For example, information from information center 110 may be sent to transportation operator 140. Such information may include operations related information from passenger conveying means 120. Further, information may be sent from information center 110 to passenger conveying means 120. Such information may include, but is not limited to conveyance related and non-conveyance related information for the passengers and operations related information for the operating personnel. Information from information center 110 may also be sent to central offices of external service providers. Such information may include, but is not limited to conveyance related information. Further still, information from information center 110 may be sent to external stationary information points 150 and may include, but is not limited to, conveyance related and non-conveyance related information for the passengers (for example, to railroad stations and bus terminals). Yet further still, information center 110 may send information flows to external stationary access points 130, such information may include, but is not limited to, conveyance related and non-conveyance related information, for example, information useful to potential passengers of a transportation operator.

Information center 110 also receives from access points 130 and from external stationary information points 150 information which may be used to prepare an accounting of services provided from access points 130 or information points 150.

In using information center 110, information supplied by the external information sources can be centrally selected, combined, and organized in either a manual or automated fashion. The consistency of data sent to the information points will be insured with respect to content and representation by the information center. Further still, the information on the actual traffic process used, for example, current tardiness, updated travel connections, etc. to mobile and stationary information points may be provided substantially simultaneously. Interfaces between the subsystems may be uniformly managed and monitored by information center 110. Services provided jointly or by one party may be balanced between the transportation operator and external service providers by using information center 110. Further still, integrated functions are automated by information center 110.

Information center 110 may be configured to work with any transportation operator, for example, with a railway company, a shipping company, a bus company, etc. The transportation operator is characterized by the fact that it organizes at its own central office the traffic flow of its passenger conveying means between a stationary access point of passengers to the conveying means.

In an exemplary embodiment, cooperation with a railway company as a transportation operator is described below in an exemplary embodiment. At information center 110, the system records information from the railway company central office (transportation operator 140) and from passenger trains of the railway company (conveying means 120). Current, conveyance related information is then sent by a mobile radio by the passenger trains of the railway company to information center 110. For example, a public mobile radio network such as, but not limited to global system for mobile communications (GSM) is used as the radio network. In particular, the information includes current position reports of the passenger trains that deviate from the schedule and, if necessary, messages regarding operational malfunctions that have occurred on the passenger trains. Position messages are determined in each passenger train, for example, by the use of a satellite navigation system such as the global positioning system (GPS). Operational malfunctions may be determined in each conveying means, for example, by use of an electronic diagnostic system. Messages of the passenger trains are transferred from information center 110 to the railway company central office. For example, a local area network (LAN) or a wide area network (WAN) data network may be used as the transmission line. Messages received from the passenger trains may be evaluated at the railway company central office. In this process, as a service, the railway company may wish to make available to its passengers any knowledge that may be received on current deviations from the overall schedule. For example, this may be a case of late arrival times and/or updated changes to scheduled connections. The transportation operator transfers the schedule information to information center 110, for example, by way of a data network. In particular, it also determines the current deviations that will be reported to the passengers.

Information center 110 prepares information and transmits it by way of a radio network (e.g., the GSM network) to the conveying mans of the transportation operator. Information center 110 also prepares and transmits information by way of digital telephone network (e.g., ISDN) using, a satellite-protected message distribution system, or mobile radio (e.g., GSM) to the train stations, for example. Information center 110 also prepares and transmits information by way of one or more of the transmission means mentioned above to other stationary information points 150 outside the area of influence of the railway company (e.g., in stores, airports, hotels, etc.). Current information will be made accessible simultaneously to customers and potential customers of the transportation operator at all information points of the three types named. Information terminals with screens, such as kiosks, and optionally equipped with printers, may be used.

Functions described above may be supplemented with additional information. Additional information may include, but is not limited to, advertising, current news, entertainment, programs, train or plane schedule information, for example. The information may be offered centrally from the external service providers, or it may be non-conveyance related information from the railway company itself. The information from the external service providers (like that of the railway company itself) may be transmitted to information center 110, for example, by using a LAN or WAN data network, processed there and distributed to the mobile and stationary information points described above. Services provided on the passenger trains, at the train stations, and the external stationary information points are transferred to information center 110 using data feedback on the transmission lines described above, processed there to prepare balances, and passed on to the railway company and the external service providers.

Accordingly, the basic problem that the existence of various information sources in servicing a transportation system and of different destinations for the information as well as very heterogeneous kinds of information to be delivered (e.g. messages about delays to/from traffic control stations, commercials, billing information, passenger announcements, train reports, all kinds of information which may be relevant or non-relevant to the conveyance of passengers or goods), must be handled by information system 110. Historically, such inconsistent types of data have been problematic. The quality of service with regards to the information is often times poor. To solve the quality of service problem, information center 110 manages the information which cares for the accurate, time near or at least time fairly near delivery of the required data.

In an exemplary embodiment, information center 110 is useful for accounting and balancing procedures. External provider and partners must rely on accurate information about how their service (e.g. entertainment) has been used within the system. Accordingly, information center 110 tracks the use of such information and such information is collected and communicated to the service providers accordingly.

Information center 110 evaluates, correlates, and combines arriving information to form new information flows. In an exemplary embodiment, the calculations are based on information generated by the conveyance means (e.g. positions, delays, stations, etc.), stored information (general time schedule), information from conveyance provider, actual time schedule, requirements from external provider (e.g. commercial updates). Software for information center 110 may be developed on standard database platforms or may be generated in other manners.

The process diagrams depicted in FIGS. 2 and 3 serve only as exemplary embodiments. The information flows are not limited to those depicted and the diagrams of FIGS. 2 and 3 are not restricted to the specific types of information flows shown. Information center 110 may be configured to handle other types and numbers of information flows.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A centralized information center, comprising:
a plurality of source information inputs comprising operating conditions of a transportation system and external service provider advertisements from a first external service provider, wherein the transportation system comprises a plurality of vehicles and a plurality of access points operating in a coordinated manner, and the operating conditions of the transportation system comprise vehicle confirmed delay and status check information;
a central processor, configured to receive information from the source information inputs;
a memory coupled to the processor;
a program running on the central processor and the program organizing information, prioritizing information and generating information flows comprising operating conditions of a transportation system and external service provider advertisements from a first external service provider, selected information flows being provided to a plurality of transportation vehicles and a plurality of first access points, the program configured to receive confirmation from the plurality of access points and from the plurality of transportation vehicles, indicating that the information flows provided thereto have been processed and displayed, and calculating a billing information for the plurality of transportation vehicles and plurality of access points based on the number of confirmations received.

2. A method of managing information for a transportation system, comprising:
receiving, by an information center, information from a plurality of information sources, the information including vehicle-confirmed delay and status check information for a plurality of vehicles operating in a coordinated manner, operations-related information for each of the plurality of vehicles operating in a coordinated manner, and advertisements from a first external service provider;
recording, by the information center, the received information;
processing, by the information center, the received information such that the information is selected, organized, and combined, and one or more information flows are created, the information flows comprising vehicle-confirmed delay and status check information and advertisements from a first external service provider; and
distributing, by the information center, the one or more information flows to each of the plurality of vehicles operating in a coordinated manner and a plurality of access points operating in a coordinated manner;
obtaining, by the information center, confirmation from the plurality of vehicles and plurality of access points that the one or more information flows provided thereto were processed; and
calculating a billing information for the plurality of transportation vehicles and plurality of access points based on the obtaining.

3. A computer readable storage medium containing a plurality of computer executable instructions for managing a transportation system comprising:
a first set of instructions for receiving information from a plurality of information sources, the information including vehicle-confirmed delay and status check information from one or more vehicles operating in a coordinated manner, transportations system related information, transportation system operations-related information, and advertisements from a first external service provider information;
a second set of instructions for recording the received information;
a third set of instructions for processing the received information such that the information is organized and prioritized, and one or more information flows are created the information flows comprising vehicle-confirmed delay and status check information and advertisements from a first external service provider; and
a fourth set of instructions for distributing the information flows to each of the plurality of vehicles, and each of a plurality of access points, of the transportation system that are operating in a coordinated manner
a fifth set of instruction for obtaining confirmation from the transportation vehicles that the one or more information flows provided thereto were processed; and
a sixth set of instructions for calculating a billing information for the plurality of transportation vehicles and plurality of access points based on the number of confirmations received.

4. The centralized information center of claim 1 wherein the program running on the central processor further transmits billing information to the first external service provider.

5. The centralized information center of claim 1 wherein the program running on the central processor further checks whether the first external service provider or a transportation operator is the communication partner and the calculating is based on the check.

6. The centralized information center of claim 1 wherein the external service provider advertisements in the information flows are based on the vehicle delay information.

7. The centralized information center of claim 1 wherein the external service provider advertisements in the information flows are based on a general time schedule.

8. The method of claim 2 further comprising transmitting the billing information to the first external service provider.

9. The method of claim 2 further comprising checking whether the first external service provider or a transportation operator is the communication partner and the calculating is based on the checking.

10. The method of claim 2 further wherein the external service provider advertisements in the information flows are based on the vehicle delay information.

11. The method of claim 2 further wherein the external service provider advertisements in the information flows are based on a general time schedule.

12. The computer readable medium of claim 3 further comprising a seventh set of instructions for transmitting the billing information to the first external service provider.

13. The computer readable medium of claim 3 further comprising an eighth set of instructions for checking whether the first external service provider or a transportation operator is the communication partner and the calculating is based on the check.

14. The computer readable medium of claim 3 further wherein the advertisements from a first external service provider in the information flows are based on the vehicle delay information.

15. The computer readable medium of claim 3 further wherein the advertisements from a first external service provider in the information flows are based on a general time schedule.

\* \* \* \* \*